(12) United States Patent
Schumacher et al.

(10) Patent No.: US 8,715,407 B2
(45) Date of Patent: *May 6, 2014

(54) HIGH-GLOSS MULTILAYER EFFECT PIGMENTS HAVING A NON-SILVER INTERFERENCE COLOR AND A NARROW SIZE DISTRIBUTION, AND METHOD FOR THE PRODUCTION THEREOF

(75) Inventors: Dirk Schumacher, Pegnitz (DE); Michael Grüner, Auerbach (DE); Günter Kaupp, Neuhaus (DE)

(73) Assignee: Eckart GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/142,520

(22) PCT Filed: Aug. 9, 2010

(86) PCT No.: PCT/EP2010/004866
§ 371 (c)(1),
(2), (4) Date: Jul. 7, 2011

(87) PCT Pub. No.: WO2011/020571
PCT Pub. Date: Feb. 24, 2011

(65) Prior Publication Data
US 2011/0259243 A1 Oct. 27, 2011

(30) Foreign Application Priority Data

Aug. 19, 2009 (DE) .................. 10 2009 037 933

(51) Int. Cl.
*C04B 14/20* (2006.01)
(52) U.S. Cl.
USPC ......... 106/417; 106/157.8; 106/404; 106/415
(58) Field of Classification Search
None
See application file for complete search history.

(56) References Cited

U.S. PATENT DOCUMENTS 3,331,699 A * 7/1967 Marshall et al. .............. 106/415
5,436,077 A * 7/1995 Matsuba et al. .............. 428/404
(Continued)

FOREIGN PATENT DOCUMENTS

DE 10 2004 041 586 A1 3/2006
EP 0289240 A1 11/1988
(Continued)

OTHER PUBLICATIONS

Lewis, Peter A. "Colorants: Organic and Inorganic Pigments" Color for Science, Art and Technology, Chapter 10; Elsevier Science B.V.; K. Nassau (editor) (1998) pp. 283-312.*

(Continued)

*Primary Examiner* — Kaj K Olsen
*Assistant Examiner* — Ross J Christie
(74) *Attorney, Agent, or Firm* — Ostrolenk Faber LLP

(57) ABSTRACT

Multilayer pearlescent pigments comprising platelet-shaped transparent substrates provided with an optically active coating, where the coating includes at least
(a) a nonabsorbing high-index layer A having a refractive index $n \geq 1.8$,
(b) a low-index layer B having a refractive index $n < 1.8$,
(c) a nonabsorbing high-index layer C having a refractive index $n \geq 1.8$
and also
(d) optionally at least one outer protective layer D
where the pigments have a cumulative frequency distribution of a volume-averaged size distribution function, with the indices $D_{10}$, $D_{50}$, $D_{90}$ and a span $\Delta D$ in a range from 0.7-1.4, the span $\Delta D$ being calculated in accordance with formula (I)

$$\Delta D = (D_{90} - D_{10})/D_{50} \quad (I).$$

The disclosure further relates to a method for producing these multilayer pearlescent pigments, and also to their use.

16 Claims, 3 Drawing Sheets

(56) References Cited

U.S. PATENT DOCUMENTS

| | | | |
|---|---|---|---|
| 5,958,125 A | 9/1999 | Schmid et al. | |
| 6,045,914 A * | 4/2000 | Sullivan et al. | 106/415 |
| 6,596,070 B1 | 7/2003 | Schmidt et al. | |
| 6,648,957 B1 * | 11/2003 | Andes et al. | 106/415 |
| 6,689,205 B1 | 2/2004 | Bruckner et al. | |
| 6,747,073 B1 * | 6/2004 | Pfaff et al. | 106/403 |
| 7,517,404 B2 * | 4/2009 | Bujard et al. | 106/481 |
| 7,594,962 B2 * | 9/2009 | Bujard et al. | 106/481 |
| 2003/0092815 A1 * | 5/2003 | Steudel et al. | 524/442 |
| 2005/0013934 A1 * | 1/2005 | Xiong et al. | 106/415 |
| 2006/0042507 A1 * | 3/2006 | Bujard et al. | 106/415 |
| 2006/0042509 A1 | 3/2006 | Henglein et al. | |
| 2006/0088488 A1 * | 4/2006 | Brun | 424/70.1 |
| 2006/0225609 A1 * | 10/2006 | Rueger et al. | 106/31.9 |
| 2006/0257662 A1 * | 11/2006 | Bujard et al. | 106/415 |
| 2007/0015012 A1 * | 1/2007 | Bujard et al. | 428/845.1 |
| 2007/0032574 A1 * | 2/2007 | Kaupp | 106/415 |
| 2007/0259182 A1 * | 11/2007 | Bujard et al. | 106/404 |
| 2009/0056591 A1 * | 3/2009 | Schmidt et al. | 106/415 |
| 2009/0169499 A1 * | 7/2009 | Bujard et al. | 106/482 |
| 2009/0246294 A1 * | 10/2009 | Hochstein et al. | 106/439 |
| 2009/0252772 A1 * | 10/2009 | Henglein et al. | 424/401 |
| 2009/0274735 A1 | 11/2009 | Wakamiya | 424/401 |
| 2009/0311209 A1 * | 12/2009 | Bujard | 106/441 |
| 2010/0011992 A1 * | 1/2010 | Bujard et al. | 106/439 |
| 2010/0047300 A1 * | 2/2010 | Kaupp et al. | 424/401 |
| 2010/0116169 A1 * | 5/2010 | Kaupp et al. | 106/31.9 |
| 2010/0203093 A1 * | 8/2010 | Bujard et al. | 106/403 |
| 2010/0297045 A1 * | 11/2010 | Kaupp et al. | 106/400 |
| 2011/0226161 A1 * | 9/2011 | Schumacher et al. | 106/417 |
| 2011/0265689 A1 * | 11/2011 | Schumacher et al. | 106/417 |
| 2011/0265690 A1 * | 11/2011 | Schumacher et al. | 106/417 |

FOREIGN PATENT DOCUMENTS

| | | |
|---|---|---|
| EP | 0 881 998 B1 | 12/1998 |
| EP | 1025168 B1 | 12/2002 |
| EP | 0948572 B1 | 7/2003 |
| EP | 0753545 B2 | 5/2006 |
| EP | 1980594 B1 | 6/2009 |
| JP | 07246366 | 9/1995 |
| JP | 2000-319540 A | 11/2000 |
| JP | A-2005-502738 | 1/2005 |
| JP | A-2008-174698 | 7/2008 |
| WO | WO 2002/090448 A2 | 11/2002 |
| WO | WO 03/006558 A2 | 1/2003 |
| WO | WO 2004/055119 A1 | 7/2004 |
| WO | WO 2004/056716 A1 | 7/2004 |
| WO | WO 2004/067645 A2 | 8/2004 |
| WO | WO 2005/063637 A1 | 7/2005 |
| WO | WO 2006/021386 A1 | 3/2006 |
| WO | WO 2006/088759 A1 | 8/2006 |
| WO | WO 2006/110359 A2 | 10/2006 |
| WO | WO 2006110359 A2 * | 10/2006 |
| WO | WO 2007/114442 A1 | 10/2007 |
| WO | WO 2008/122420 A1 | 10/2008 |
| WO | WO 2009/103322 A1 | 8/2009 |

OTHER PUBLICATIONS

German Search Report dated Aug. 5, 2011 in corresponding German Application No. 10 2009 037 934.7.
International Search Report dated Nov. 30, 2010, issued in corresponding international application No. PCT/EP2010/004866.
Byk-Gardner Katalog 2007/2008 (p. 14) in German and English translation thereof.
Chinese Office Action, dated Mar. 5, 2013, issued in corresponding Chinese Patent Application No. 201080004653.7, including English Translation.
Office Action dated Apr. 5, 2013 in U.S. Appl. No. 13/131,671.
Decision of Refusal dated May 14, 2013 in corresponding Japanese Patent Application No. 2012-525074 (English language translation).
Notice of Reasons for Rejection dated Dec. 3, 2013 in corresponding Japanese Patent Application No. 2012-525071 (with English language translation).
Notice of Reasons for Rejection dated Dec. 3, 2013 in corresponding Japanese Patent Application No. 2012-525072 (with English language translation).

* cited by examiner

Figure 2: Effect of particle properties on laser diffraction
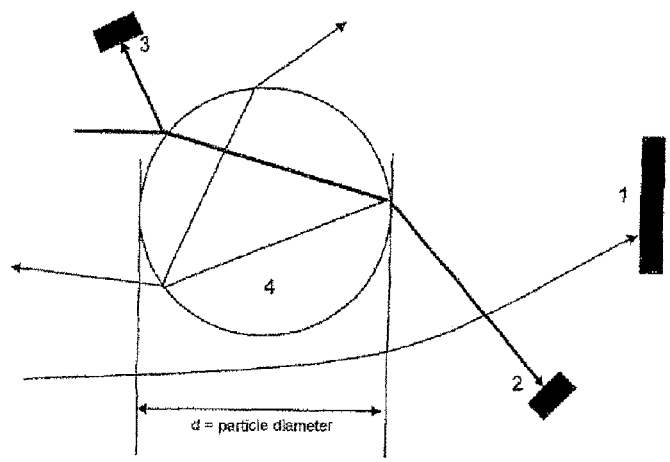
Particle properties:
d: diameter
1: diffraction
2: refraction
3: reflection
4: absorption

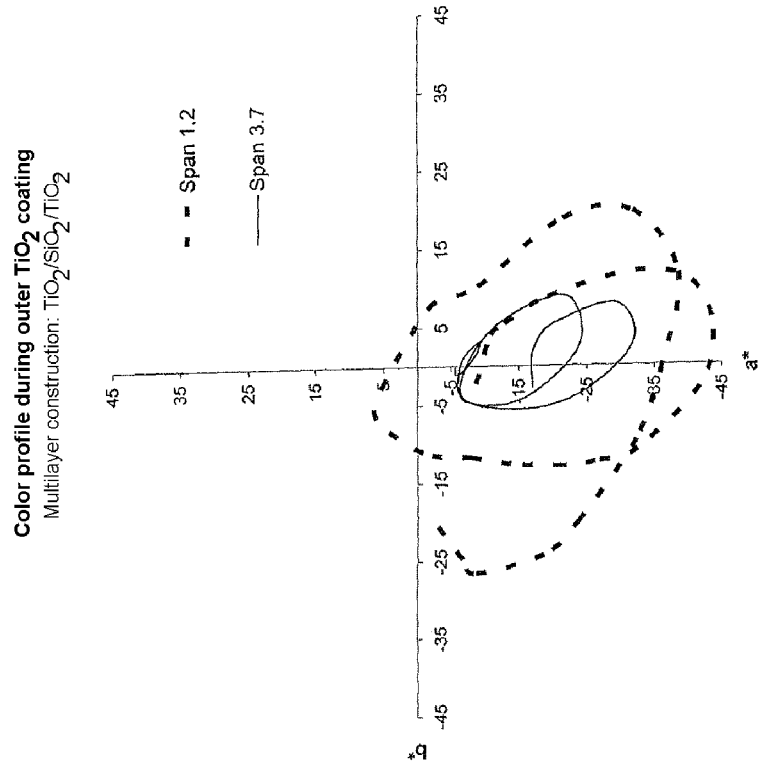
Figure 3: Color profile of the outer TiO₂ coating

HIGH-GLOSS MULTILAYER EFFECT PIGMENTS HAVING A NON-SILVER INTERFERENCE COLOR AND A NARROW SIZE DISTRIBUTION, AND METHOD FOR THE PRODUCTION THEREOF

CROSS REFERENCE TO RELATED APPLICATIONS

The present application is a 35 U.S.C. §371 National Phase conversion of PCT/EP2010/004866, filed Aug. 9, 2010, which claims benefit of German Application No. 10 2009 037 933.9, filed Aug. 19, 2009, the disclosure of which is incorporated herein by reference. The PCT International Application was published in the German language.

TECHNICAL FIELD

The present invention relates to highly lustrous multilayer pearlescent pigments with a nonsilver interference color, to a method for producing them, and to the use thereof in cosmetic formulations, plastics, films, textiles, ceramic materials, glasses, and coating compositions such as paints, printing inks, liquid inks, varnishes or powder coatings.

BACKGROUND

Goniochromatic luster pigments are described in EP 0 753 545 B2. At least one layer stack comprising a colorless low-index coating and a reflecting, selectively or nonselectively absorbing coating, and also, optionally, an outer protective layer, is applied here to a multiply coated, high-index, nonmetallic, platelet-shaped substrate. The layer thickness of the low-index colorless coating reduces as the number of layer stacks applied to the substrate increases. The goniochromatic luster pigments exhibit an angle-dependent color change between two or more intense interference colors.

In accordance with WO 2004/067645 A2, a transparent substrate is coated with an uneven number—at least three—of layers of high and low refractive index in alternation. The difference in refractive index between the adjacent layers is at least 0.2. At least one of the layers differs in its optical thickness from the others. The resulting multilayer effect pigments therefore do not possess a layer construction in which the optical thickness of each layer is an uneven multiple of a quarter of the light wavelength for interference (no "quarter-wave-stack" construction).

In WO 2006/088759 A1, the multilayer effect pigments are coated with titanium dioxide, with a low-index layer having an optical layer thickness of at least 150 nm, and then again with a high-index layer comprising titanium dioxide, with an optical layer thickness of approximately 45 to 240 nm. The first titanium dioxide layer gives the substrate a silvery luster, whereas the resulting multilayer effect pigments do not possess a silvery luster. On account of the optical layer thickness of the low-index layer, the multilayer effect pigments possess a color flop. Here as well, in the same way as for WO 2004/067645 A2, the adjacent layers have a refractive index difference of at least 0.2. Again, the intention is not to have a layer construction in which the optical thickness of each layer is an uneven multiple of a quarter of the light wavelength for interference (no "quarter-wave-stack" construction).

Multilayer interference pigments with strong interference colors and/or with a strong angular dependency of the interference colors, consisting of a transparent base material coated with alternating layers of metal oxides of low and high refractive index, are described in EP 0 948 572 B1. The difference in the refractive indices is at least 0.1. The number and thickness of the layers are dependent on the desired effect and on the substrate used. Considering the construction $TiO_2$—$SiO_2$—$TiO_2$ on a mica substrate, for example, pigments with a blue interference color are obtained when optically thin $TiO_2$ and $SiO_2$ layers with a layer thickness <100 nm are used, said pigments being more strongly colored than pure $TiO_2$-mica pigments. The incidence of thick $SiO_2$ layers with a layer thickness >100 nm produces pigments having a strongly pronounced angular dependency of the interference color.

JP 07246366 describes an optical interference material which is constructed from alternating layers of high and low refractive index, the optical thickness of each layer being an uneven multiple of a quarter of the light wavelength for interference ("quarter-wave-stack" construction).

Interference pigments based on multiply coated, platelet-shaped substrates which have at least a layer sequence comprising a high-index layer, a low-index colorless layer, a nonabsorbing high-index layer, and optionally an outer protective layer, can be produced in accordance with EP 1 025 168. Between the substrate and the first layer, and/or between the individual layers, there may be further colored or colorless metal oxide layers. The interference pigments may comprise two or more identical or different combinations of layer stacks, but the covering of the substrate with just one layer stack is preferred. In order to intensify the color flop, the interference pigments may comprise up to four layer stacks, but the thickness of all the layers on the substrate ought not to exceed 3 µm.

Multilayer pigments based on glass flakes which are coated with at least three alternating layers of high and low refractive index are described in WO 2003/006558 A2. The glass flakes here possess a thickness of <1 µm. In addition to intense colors, the multilayer pigments exhibit a strong color flop.

WO 2004/055119 A1 describes interference pigments based on coated, platelet-shaped substrates. The substrates in this case are covered with a first layer of $SiO_2$, over which is applied, subsequently, a high-index layer, consisting for example of $TiO_2$, $ZrO_2$, $SnO_2$, $Cr_2O_3$, $Fe_2O_3$ or $Fe_3O_4$, or an interference system comprising alternating high-index and low-index layers. The pigments may optionally also have an outer protective layer. In this way, silver-white interference pigments, or interference pigments with brilliant interference colors, are obtained, which are notable for performance properties, such as mechanical stability and photo stability, but which do not have an extremely high gloss. The color of the interference pigments is not dependent or is only minimally dependent on the angle.

Thermally and mechanically stable effect pigments based on thin glass platelets with a thickness ≤1.0 µm are known from WO 2002/090448 A2. The effect pigments may be covered with one or more high-index and/or low-index layer(s). The glass flakes possess a softening temperature of ≥800° C.

The optical properties of effect pigments can be influenced, according to WO 2006/110359 A2, by a suitable particle size distribution. The glass platelets described here, classified and coated with a single metal oxide layer, have a $D_{10}$ of at least 9.5 µm, preferably of 9.5 µm. A disadvantage is that the pigments have to have a size range with a $D_{90}$ of not more than 85 µm, preferably of about 45 µm.

SUMMARY

The object of the present invention is to provide highly lustrous multilayer pearlescent pigments with a nonsilver interference color and at the same time a high chroma that exhibit the combination of deep-down luster and transparency that is typical of pearlescent pigments, and that possess increased gloss relative to the pearlescent pigments known from the prior art. A further object of the invention is to provide a method for producing these multilayer pearlescent pigments.

The object on which the invention is based has been achieved through provision of multilayer pearlescent pigments, comprising platelet-shaped transparent substrates provided with an optically active coating, where the optically active coating comprises at least (a) a nonabsorbing high-index layer A having a refractive index n≥1.8,
(b) a low-index layer B having a refractive index n<1.8,
(c) a nonabsorbing high-index layer C having a refractive index n≥1.8
and also
(d) optionally at least one outer protective layer D, and in that the multilayer pearlescent pigments have a cumulative frequency distribution of a volume-averaged size distribution function, with the indices $D_{10}$, $D_{50}$, $D_{90}$ and a span ΔD in a range from 0.7-1.4, the span ΔD being calculated in accordance with formula (I)

$$\Delta D = (D_{90} - D_{10})/D_{50} \qquad (I).$$

Preferred developments are specified in dependent claims 2 to 11.

The object on which the invention is based has additionally been achieved through provision of a method for producing the multilayer pearlescent pigments of the invention, that comprises the following steps:

(i) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span ΔD in a range of 0.7-1.4, the span ΔD being defined in accordance with the formula $\Delta D = (D_{90} - D_{10})/D_{50}$, (ii) applying at least the layers A to C to the platelet-shaped transparent substrates, and also, optionally, at least one layer D, or (iii) applying at least the layers A to C to the platelet-shaped transparent substrates, and also, optionally, at least one layer D, (iv) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span ΔD in a range of 0.7-1.4, the span ΔD being defined in accordance with the formula $\Delta D = (D_{90} - D_{10})/D_{50}$.

The coating of the platelet-shaped substrates preferably takes place in step (ii) after the size-classifying in step (i).

Further provided by the invention is the use of the multilayer pearlescent pigments of the invention in cosmetic formulations, plastics, films, textiles, ceramic materials, glasses, and coating compositions, such as paints, printing inks, liquid inks, varnishes, and powder coatings. The invention accordingly provides preparations which comprise the multilayer pearlescent pigments of the invention. The invention is also directed to articles which are provided—coated or printed, for example—with the multilayer pearlescent pigments of the invention. Accordingly, coated articles, such as bodyworks, facing elements, etc., or printed articles, such as paper, card, films, textiles, etc., are likewise part of the present invention.

BRIEF DESCRIPTION OF THE DRAWINGS

FIG. 2 shows the effect of particle properties on laser diffraction;
and
FIG. 3 shows a color profile of an outer $TiO_2$ coating.

DETAILED DESCRIPTION

Figure 1:
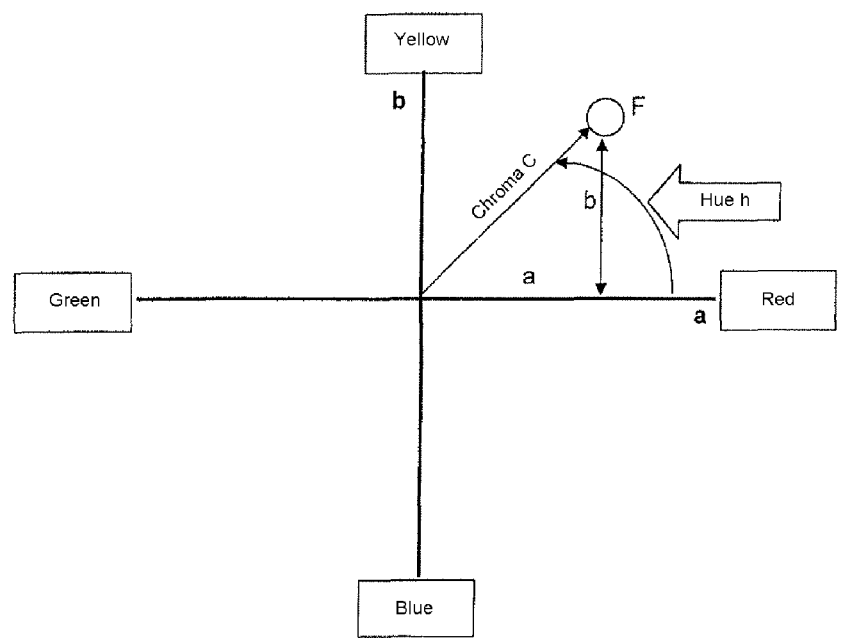
FIG. 1 shows a point F in the CIELab color system.

The perception of a color as matt, pale or strong is critically dependent on its color saturation, referred to as the chroma.

The chroma is determined by the amount of gray present. The higher the gray content, the lower the color saturation.

Considering a point F in the CIELab color system, it is defined via the three coordinates L* (lightness), a* (red-green axis), and b* (yellow-blue axis). The color coordinates a* and b* may also be expressed by way of polar coordinates C* (chroma) and h* (color angle, color locus), the definition being given as follows:

$$C^* = \sqrt{a^{*2} + b^{*2}}$$

$$h^* = \frac{180}{\pi} \cdot \arctan\left(\frac{b^*}{a^*}\right)$$

The chroma, therefore, corresponds to the length of the vector which points from the origin of the coordinate system to the point F that is to be defined. The lower the value of C*, the closer the point F to the achromatic, gray region of the color coordinate system. The chroma is therefore the distance from the L* axis or gray axis which is perpendicular to the plane a*,b* (FIG. 1).

Effect pigments which have a silver interference color are distinguished by low chroma values; in other words, the interference colors are achromatic colors.

Multilayer pearlescent pigments with a nonsilver interference color are understood for the purposes of this invention to be multilayer pearlescent pigments whose chroma values $C^*_{15}$ are >20.

The chroma values here are determined from the following applications: a nitrocellulose varnish (Dr. Renger Erco Bronzemischlack 2615e; Morton) containing 6% by weight of multilayer pearlescent pigments, the % by weight figure being based on the total weight of the varnish, is applied, depending on $D_{50}$ value, in a wet film thickness in accordance with table 1, to BYK-Gardner black/white drawdown charts (Byko-Chart 2853), and subsequently dried at room temperature. Then, using a BYK-MAC (BYK Gardner), colorimetric evaluations are performed on these drawdown charts, with measurement taking place on the black background of the drawdown chart. The incident angle is 45° and the chroma value employed is that at an observation angle of 15°.

Table 1: Wet film thickness as a function of the $D_{50}$ value of the multilayer pearlescent pigments

| $D_{50}$ value | Wire doctor |
|---|---|
| <40 μm | 36 μm |
| 40 μm-85 μm | 76 μm |
| >85 μm | 100 μm |

The inventors have surprisingly observed that the multilayer pearlescent pigments of the invention with a span $\Delta D = (D_{90} - D_{10})/D_{50}$ in the range from 0.7 to 1.4 exhibit an extremely strong gloss and a significantly increased chroma.

The size distribution of the multilayer pearlescent pigments is characterized in accordance with the invention by using the span ΔD, defined as $\Delta D = (D_{90} - D_{10})/D_{50}$. The smaller the span, the narrower the size distribution.

The $D_{10}$, $D_{50}$ or $D_{90}$ value in the cumulative frequency distribution of the volume-averaged size distribution function, as is obtained by laser diffraction methods, indicates that 10%, 50%, and 90%, respectively, of the multilayer pearlescent pigments have a diameter which is the same as or smaller than the respectively indicated value. In this case, the size distribution curve is determined using an instrument from Malvern (instrument: Malvern Mastersizer 2000) in accordance with manufacturer indications. In this instrument, the scattered light signals were evaluated in accordance with the theory of Mie, which also includes refraction and absorption behavior on the part of the particles (FIG. 2).

The multilayer pearlescent pigments of the invention possess a span $\Delta D$ in a range from 0.7 to 1.4, preferably in a range from 0.7 to 1.3, more preferably in a range from 0.8 to 1.2, very preferably in a range from 0.8 to 1.1. In further-preferred embodiments the span $\Delta D$ is in a range from 0.85 to 1.05.

Where the multilayer pearlescent pigments have a span $\Delta D$ of more than 1.4, the multilayer pearlescent pigments obtained are not highly lustrous. Multilayer pearlescent pigments below a span of the size distribution of 0.7 are very complicated to prepare by the usual techniques, and hence can no longer be produced economically.

The span $\Delta D$ of the platelet-shaped transparent substrate to be coated corresponds substantially to that of the multilayer pearlescent pigment of the invention and is ≤1.4, preferably ≤1.3, more preferably ≤1.2, very preferably ≤1.1, and especially preferably ≤1.05.

The multilayer pearlescent pigments of the invention may have any desired average particle size ($D_{50}$). The $D_{50}$ values of the multilayer pearlescent pigments of the invention are situated preferably within a range from 3 to 350 µm. The multilayer pearlescent pigments of the invention preferably have a $D_{50}$ value from a range from 3 to 15 µm or from a range from 10 to 35 µm or from a range from 25 to 45 µm or from a range from 30 to 65 µm or from a range from 40 to 140 µm or from a range from 135 to 250 µm.

The $D_{10}$ values of the multilayer pearlescent pigments of the invention encompass preferably a range from 1 to 120 µm. The multilayer pearlescent pigments of the invention preferably have the combinations of $D_{10}$, $D_{50}$, and $D_{90}$ values that are indicated in table 2. In this context, the $D_{10}$, $D_{50}$, and $D_{90}$ values of table 2 are combined only in such a way as to produce a span $\Delta D$ from a range from 0.7 to 1.4, preferably from a range from 0.7 to 1.3, more preferably from a range from 0.8 to 1.2, very preferably from a range from 0.8 to 1.1, and especially preferably from a range from 0.85 to 1.05. Combinations of $D_{10}$, $D_{50}$, and $D_{90}$ values that lead to a span $\Delta D$ which is not situated in the range from 0.7 to 1.4 are not inventive embodiments.

TABLE 2

Preferred combinations of ranges of the $D_{10}$, $D_{50}$, and $D_{90}$ values

| $D_{10}$ (µm) | $D_{50}$ (µm) | $D_{90}$ (µm) |
|---|---|---|
| 1-5 | 3-15 | 8-25 |
| 5-25 | 10-35 | 20-45 |
| 10-30 | 25-45 | 40-70 |
| 20-45 | 30-65 | 70-110 |
| 25-65 | 40-140 | 120-180 |
| 75-110 | 135-250 | 400-490 |

In this context it has emerged, surprisingly, that the size of the multilayer pearlescent pigments, characterized with the $D_{50}$ value, is not critical, and instead that the span $\Delta D=(D_{90}-D_{10})/D_{50}$ is in a narrow range from 0.7 to 1.4. The $D_{50}$ values of the multilayer pearlescent pigments may be, for example, 15, 20, 25 or 30 µm or else 50, 80, 100, 150, 200, 250, 300 or 350 µm.

Suitable platelet-shaped transparent substrates to be coated are nonmetallic, natural or synthetic platelet-shaped substrates. The substrates are preferably substantially transparent, more preferably transparent, which means that they are at least partly transmissive to visible light.

According to one preferred embodiment of the invention, the platelet-shaped transparent substrates may be selected from the group consisting of natural mica, synthetic mica, glass flakes, $SiO_2$ platelets, $Al_2O_3$ platelets, polymer platelets, platelet-shaped bismuth oxychloride, platelet-shaped substrates comprising a hybrid organic-inorganic layer, and mixtures thereof. The platelet-shaped transparent substrates are preferably selected from the group consisting of natural mica, synthetic mica, glass flakes, $SiO_2$ platelets, $Al_2O_3$ platelets, and mixtures thereof. With particular preference the platelet-shaped transparent substrates are selected from the group consisting of natural mica, synthetic mica, glass flakes, and mixtures thereof. Especially preferred are glass flakes and synthetic mica, and mixtures thereof.

In contrast to synthetic platelet-shaped transparent substrates, natural mica possesses the disadvantage that contaminations, as a result of incorporated extraneous ions, may alter the hue, and that the surface is not ideally smooth but instead may have irregularities, such as steps, for example.

Even when a natural substrate is used, however, it has surprisingly emerged that the luster of a plurality of multilayer pearlescent pigments can be increased when the span $\Delta D$ is in a range from 0.7 to 1.4, as compared with a plurality of conventional, broad-span multilayer pearlescent pigments.

Synthetic substrates such as, for example, glass flakes or synthetic mica, in contrast, have smooth surfaces, a uniform thickness within an individual substrate particle, and sharp edges. Consequently the surface offers only a few scattering centers for incident and reflected light, and accordingly, after coating, allows more highly lustrous multilayer pearlescent pigments than with natural mica as substrate. Glass flakes used are preferably those which are produced by the methods described in EP 0 289 240 A1, WO 2004/056716 A1, and WO 2005/063637 A1. The glass flake substrates which can be used may have, for example, a composition in accordance with the teaching of EP 1 980 594 B1.

The average geometric thickness of the platelet-shaped transparent substrates to be coated is in a range from 50 nm to 5000 nm, preferably in a range from 60 nm to 3000 nm, and more preferably in a range from 70 nm to 2000 nm. In one embodiment, the average geometric thickness for glass flakes as the substrate to be coated is in a range from 750 nm to 1500 nm. Glass flakes of this kind are available commercially on a broad basis. Further advantages are offered by thinner glass flakes. The thinner substrates result in a lower overall layer thickness of the multilayer pearlescent pigments of the invention. Preference is therefore likewise given to glass flakes whose average geometric thickness is in a range from 100 nm to 700 nm, more preferably in a range from 150 nm to 600 nm, very preferably in a range from 170 nm to 500 nm, and especially preferably in a range from 200 nm to 400 nm. In another embodiment, the average geometric thickness for natural or synthetic mica as the substrate to be coated is preferably in a range from 100 nm to 700 nm, more preferably in a range from 150 nm to 600 nm, very preferably in a range from 170 nm to 500 nm, and especially preferably in a range from 200 nm to 400 nm.

If platelet-shaped transparent substrates below an average geometric thickness of 50 nm are coated with high-index metal oxides, then the multilayer pearlescent pigments obtained are extremely fracture-sensitive, and may completely fragment even during incorporation into the application medium, with the consequence of a significant reduction in luster.

Above an average geometric substrate thickness of 5000 nm, the multilayer pearlescent pigments may become too thick overall. This is accompanied by a poorer specific opacity, i.e., surface area hidden per unit weight of multilayer pearlescent pigment of the invention, and also by a lower plane-parallel orientation in the application medium. The result of a poorer orientation, in turn, is a reduced luster.

The average geometric thickness of the platelet-shaped transparent substrate is determined on the basis of a cured varnish film in which the multilayer pearlescent pigments are aligned substantially plane-parallel to the substrate. For this purpose, a ground section of the cured varnish film is investigated under a scanning electron microscope (SEM), the geometric thickness of the platelet-shaped transparent substrate of 100 multilayer pearlescent pigments being determined and averaged statistically.

The multilayer pearlescent pigments of the invention are obtained by coating the platelet-shaped transparent substrates with at least one optically active coating which comprises
a) a nonabsorbing high-index layer A having a refractive index n≥1.8
b) a low-index layer B having a refractive index n<1.8
c) a nonabsorbing high-index layer C having a refractive index n≥1.8
and also
d) optionally an outer protective layer D. The layers A and B, and B and C, may be applied multiply below the outer protective layer D. It is preferred to apply, always in alternation, high-index and low-index layers to the substrate. With particular preference the platelet-shaped substrate is coated only once with the layers A to C, optionally D.

In accordance with the invention, the layer A is internal in the layer arrangement, i.e., is facing the platelet-shaped transparent substrate; the layer B is situated between the layer A and the layer C, and the layer C, based on the platelet-shaped transparent substrate, is external in the layer arrangement.

Between the platelet-shaped transparent substrate and the layer A there may be one or more further, preferably substantially transparent, layers arranged. According to one preferred development, the layer A is applied directly to the platelet-shaped transparent substrate.

Between the layer A and the layer B, and also between the layer B and the layer C, there may be arranged, independently of one another, one or more further, preferably substantially transparent, layers. According to one preferred development, the layer B is applied directly to the layer A. According to another preferred development, the layer C is applied directly to the layer B.

With especial preference, the layer A is applied directly to the platelet-shaped transparent substrate, the layer B directly to the layer A and the layer C directly to the layer B, and also, optionally, layer D directly to the layer C.

As optically active layers or coatings it is preferred to apply layers which comprise metal oxides, metal oxide hydrates, metal hydroxides, metal fluorides, metal oxyhalides, metal chalcogenides, metal sulfides or mixtures thereof. According to one preferred variant, the optically active layers or coatings consist of the aforementioned materials.

The terms layers or coatings are used interchangeably for the purposes of this invention, unless otherwise indicated.

The refractive index of the high-index layers A and C is in each case n≥1.8, preferably n≥1.9, and more preferably n≥2.0. The refractive index of the low-index layer B is n<1.8, preferably n<1.7, and more preferably n<1.6.

The nonabsorbing materials suitable for the high-index layer A or C are, for example,
metal oxides such as titanium dioxide, zirconium dioxide, zinc oxide, tin dioxide, antimony oxide, and mixtures thereof,
metal hydroxides,
metal oxide hydrates,
metal sulfides such as zinc sulfide,
metal oxyhalides such as bismuth oxychloride.

In a further embodiment, the high-index metal oxide coating may comprise small amounts (generally 5% by weight) of further colored or colorless metal oxides. For example, a titanium dioxide layer may be doped with small amounts of iron oxide.

One preferred embodiment uses metal oxides, metal hydroxides and/or metal oxide hydrates as high-index layer A and/or C. Particular preference is given to the use of metal oxides. With very particular preference, the layers A and C comprise titanium dioxide. In one embodiment, the layers A and C are composed of titanium dioxide.

In this case, the titanium dioxide may be present in the rutile or anatase crystal modification. The titanium dioxide layer is preferably in the rutile form. The rutile form can be obtained by, for example, applying a layer of tin dioxide to the substrate to be coated, before the titanium dioxide layer is applied. Titanium dioxide crystallizes in the rutile modification on this layer of tin dioxide. This tin dioxide may take the form of a separate layer, in which case the layer thickness may be a few nanometers, as for example less than 10 nm, more preferably less than 5 nm, even more preferably less than 3 nm.

Nonabsorbing materials are used as low-index layer B. These materials include, for example,
metal oxides such as silicon dioxide, aluminum oxide, boron oxide,
metal oxide hydrates such as silicon oxide hydrate, aluminum oxide hydrate,
metal fluorides such as magnesium fluoride,
$MgSiO_3$.

The low-index metal oxide layer may optionally comprise alkali metal oxides and/or alkaline earth metal oxides as constituents.

The low-index layer B preferably comprises silicon dioxide. In one embodiment, the low-index layer B consists of silicon dioxide.

The interference-capable coating may either envelop the substrate completely or may be present only partially on the substrate. The multilayer pearlescent pigments of the invention are distinguished by the uniform, homogeneous construction of the coating which envelops the platelet-shaped substrate completely and covers not only its top and bottom faces.

The individual layers of the multilayer pearlescent pigments of the invention may each be designed as $\lambda/4$ layers. It has surprisingly emerged, however, that it is not necessary for the layers to have to be designed as $\lambda/4$ layers in order for highly lustrous and preferably also highly chromatic multilayer pearlescent pigments to be obtained. The critical parameter is the span of the size distribution, in order to obtain highly lustrous and preferably also high-chroma multilayer pearlescent pigments.

The optical thickness of the nonmetallic layers with high and low refractive indices determines the optical properties of the multilayer pearlescent pigments. The number and thickness of the layers is dependent on the desired effect and on the substrate used. If n is the refractive index of a layer and d is its thickness, the interference color in which a thin layer appears is given by the product of n and d, i.e., the optical thickness. The colors of such a film that come about in the reflecting light under normal light incidence result from a strengthening of the light of the wavelength $$\lambda = \frac{4}{2N-1} \cdot nd$$

and by attenuation of light of the wavelength $$\lambda = \frac{2}{N} \cdot nd,$$

where N is a positive integer. The variation in color that occurs with increasing film thickness results from the strengthening or attenuation of particular wavelengths of the light through interference.

In the case of multilayer pigments, the interference color is determined by the strengthening of particular wavelengths, and, if two or more layers in a multilayer pigment possess the same optical thickness, the color of the reflecting light becomes more intense as the number of layers increases. In addition, a particularly strong variation of the color can be achieved depending on the viewing angle by suitably selecting the layer thickness of the low-index layer B. A pronounced color flop can thus be developed.

The multilayer pigments of the invention with a nonsilver interference color may have optical layer thicknesses of the high-index layers A and C which are in each case in the range from 30 nm to 900 nm, preferably in the range from 40 nm to 880 nm, and more preferably in the range from 50 nm to 850 nm. The optical layer thickness of the low-index layer B may be in a range from 30 nm to 500.

According to one preferred embodiment of the present invention, with the layer sequences stated above, the layer B has an optical layer thickness of ≤150 nm, preferably of <140 nm, and even more preferably of <130 nm. An optical layer thickness for the layer B in the range from 30 nm to ≤150 nm, preferably in the range from 40 nm to 140 nm, and more preferably in the range from 50 nm to 130 nm, has proven very suitable.

If the optical layer thickness of the layer B is ≤150 nm, the multilayer pearlescent pigments of the invention exhibit substantially no angle-dependent interference color. In this embodiment, the multilayer pearlescent pigments of the invention only have one interference color, the intensity thereof changing from light to dark as a function of the viewing angle.

According to a further preferred development of the present invention, with the layer sequences stated above, the layer B has an optical layer thickness of >150 nm, preferably of >180 nm, even more preferably of >220 nm. An optical layer thickness for the layer B in the range from >150 nm to 500 nm, preferably in the range from 180 nm to 480 nm, and more preferably in the range from 220 nm to 450 nm has proven very suitable.

If the optical layer thickness of the layer B is >150 nm, the multilayer pearlescent pigments of the invention have an angle-dependent interference color. In this embodiment, the multilayer pearlescent pigments of the invention exhibit at least two interference colors in dependence on the viewing angle. This embodiment of the multilayer pearlescent pigments of the invention may also be referred to as goniochromatic multilayer pearlescent pigment. With this variant of the invention, therefore, highly lustrous multilayer pearlescent pigments with an intense color flop are obtained. These multilayer pearlescent pigments may have, for example, an interference color change from red to green or from blue to yellow.

The transition between multilayer pearlescent pigments with no color flop, slight color flop, and intense color flop in dependence on the optical layer thickness of the low-index layer B is a fluid one. As the optical layer thickness of the low-index layer B goes up, above 150 nm, first of all multilayer pearlescent pigments are obtained which exhibit only a slight color flop, which ultimately, as the optical layer thickness of layer B increases further, turns into an intense color flop. An intense color flop typically extends over a plurality of quadrants in the CIELab color coordinate system.

The layer thicknesses indicated in this application are, unless otherwise indicated, the optical layer thicknesses. By an optical layer thickness is meant, in accordance with the invention, the product of geometric layer thickness and the refractive index of the material which constitutes the layer. As the value for the refractive index of the material in question, the value known in each case from the literature is used. In accordance with the invention, the geometric layer thickness is determined on the basis of SEM micrographs of ground sections of varnishes containing multilayer pearlescent pigments oriented plane-parallel to the substrate.

The multilayer pearlescent pigments may additionally be provided with at least one outer protective layer D, which further increases the stability of the multilayer pearlescent pigment with respect to light, weather and/or chemicals. The outer protective layer D may also be an aftercoat which facilitates the handling of the pigment on incorporation into different media.

The outer protective layer D of the multilayer pearlescent pigments of the invention may comprise or, preferably, consist of one or two metal oxide layers of the elements Si, Al or Ce. In one variant a silicon oxide layer, preferably $SiO_2$ layer, is applied as outermost metal oxide layer. Particular preference here is given to a sequence in which first of all a cerium oxide layer is applied, which is then followed by an $SiO_2$ layer, as described in WO 2006/021386 A1, the content of which is hereby incorporated by way of reference.

The outer protective layer D may additionally be organic-chemically modified on the surface. For example, one or more silanes may be applied to this outer protective layer. The silanes may be alkylsilanes having branched-chain or unbranched alkyl radicals having 1 to 24 C atoms, preferably 6 to 18 C atoms.

The silanes may alternatively be organofunctional silanes which allow chemical attachment to a plastic, a binder of a paint or of an ink, etc.

The organofunctional silanes which are used preferably as surface modifiers and which have suitable functional groups are available commercially and are produced, for example, by Evonik and sold under the trade name "Dynasylan". Further products may be purchased from Momentive (Silquest silanes) or from Wacker, examples being standard silanes and α-silanes from the GENIOSIL product group.

Examples of these products are 3-methacryloyloxypropyl-trimethoxysilane (Dynasylan MEMO, Silquest A-174NT), vinyltri(m)ethoxysilane (Dynasylan VTMO or VTEO, Silquest A-151 or A-171), methyltri(m)ethoxysilane (Dynasylan MTMS or MTES), 3-mercaptopropyltrimethoxy-silane (Dynasylan MTMO; Silquest A-189), 3-glycidyloxy-propyltrimethoxysilane (Dynasylan GLYMO, Silquest A-187), tris [3-(trimethoxysilyl)propyl] isocyanurate (Silquest Y-11597), bis[3-(triethoxysilyl)propyl)]tetrasulfide (Silquest A-1289), bis[3-(triethoxy-silyl)propyl disulfide (Silquest A-1589, beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl (m)-ethyldimethoxysilane (GENIOSIL XL 32, XL 34), (isocyanatomethyl)methyldimethoxysilane, (isocyanatomethyl)trimethoxysilane, 3-(triethoxysilyl)propyl-succinic anhydride (GENIOSIL GF 20), (methacryloyloxy-methyl)methyldiethoxysilane, 2-acryloyloxyethylmethyl-dimethoxysilane, 2-methacryloyloxyethyltrimethoxy-silane, 3-acryloyloxypropylmethyldimethoxysilane, 2-acryloyloxyethyltrimethoxysilane, 2-methacryloyloxyethyltriethoxysilane, 3-acryloyloxypropyltrimethoxy-silane, 3-acryloyloxypropyltripropoxysilane, 3-meth-acryloyloxypropyltriethoxysilane, 3-methacryloyloxy-propyltriacetoxysilane, 3-methacryloyloxypropylmethyl-dimethoxysilane, vinyltrichlorosilane, vinyltrimethoxy-silane (GENIOSIL XL 10), vinyltris(2-methoxyethoxy)silane (GENIOSIL GF 58), and vinyltriacetoxysilane.

As organofunctional silanes it is preferred to use 3-methacryloyloxypropyltrimethoxysilane (Dynasylan MEMO, Silquset A-174NT), vinyltri(m)ethoxysilane (Dynasylan VTMO or VTEO, Silquest A-151 or A-171), methyltri(m)ethoxysilane (Dynasylan MTMS or MTES), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxy-methyltri(m)ethoxysilane (GENIOSIL XL 33, XL 36), (methacryloyloxymethyl)(m)ethyldimethoxysilane (GENIOSIL XL 32, XL 34), 3-(triethoxysilyl)propyl-succinic anhydride (GENIOSIL GF 20), vinyltrimethoxy-silane (GENIOSIL XL 10) and/or vinyltris(2-methoxy-ethoxy)silane (GENIOSIL GF 58).

It is, however, also possible to apply other organo-functional silanes to the multilayer pearlescent pigments of the invention.

It is additionally possible to use aqueous prehydro-lyzates that are obtainable, for example, commercially from Degussa. These include, among others, aqueous aminosiloxane (Dynasylan Hydrosil 1151), aqueous amino-/alkyl-functional siloxane (Dynasylan Hydrosil 2627 or 2909), aqueous diamino-functional siloxane (Dynasylan Hydrosil 2776), aqueous epoxy-functional siloxane (Dynasylan Hydrosil 2926), amino-/alkyl-functional oligosiloxane (Dynasylan 1146), vinyl-/alkyl-functional oligosiloxane (Dynasylan 6598), oligomeric vinylsilane (Dynasylan 6490) or oligomeric short-chain alkyl-functional silane (Dynasylan 9896).

In one preferred embodiment, the organofunctional silane mixture comprises at least one amino-functional silane as well as at least one silane without a functional binding group. The amino function is a functional group which is able to enter into one or more chemical interactions with the majority of groups that are present in binders. This may involve a covalent bond, such as with isocyanate functions or carboxylate functions of the binder, for example, or hydrogen bonds such as with OH functions or COOR functions, or else ionic interactions. An amino function is therefore very highly suitable for the purpose of the chemical attachment of the multilayer pearlescent pigment to different kinds of binders.

For this purpose it is preferred to take the following compounds: 3-aminopropyltrimethoxysilane (Dynasylan AMMO; Silquest A-1110), 3-aminopropyltriethoxysilane (Dynasylan AMEO), [3-(2-aminoethyl)aminopropyl]trimethoxysilane (Dynasylan DAMO, Silquest A-1120), [3-(2-aminoethyl)aminopropyl]triethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltri-methoxysilane (Silquest Y-9669), 4-amino-3,3-dimethyl-butyltrimethoxysilane (Silquest A-1637), N-cyclohexyl-aminomethylmethyldiethoxysilane (GENIOSIL XL 924), N-cyclohexylaminomethyltriethoxysilane (GENIOSIL XL 926), N-phenylaminomethyltrimethoxysilane (GENIOSIL XL 973), and mixtures thereof.

In a further-preferred embodiment, the silane without a functional binding group is an alkylsilane. The alkyl-silane preferably has the formula (A):

$$R_{(4-z)}Si(X)_z \qquad (A)$$

In this formula, z is an integer from 1 to 3, R is a substituted or unsubstituted, unbranched or branched alkyl chain having 10 to 22 C atoms, and X is a halogen group and/or alkoxy group. Preference is given to alkylsilanes having alkyl chains having at least 12 C atoms. R may also be joined cyclically to Si, in which case z is typically 2.

At or on the surface of the multilayer pearlescent pigments of the invention, in addition to the aforementioned silanes and silane mixtures, there may also be further organic-chemical modifiers arranged, such as, for example, substituted or unsubstituted alkyl radicals, polyethers, thioethers, siloxanes, etc., and mixtures thereof. It is, however, also possible for inorganic-chemical modifiers (e.g., $Al_2O_3$ or $ZrO_2$ or mixtures thereof) to be applied to the pigment surface, these modifiers being able, for example, to increase the dispersibility and/or compatibility in the respective application medium.

Via the surface modification it is possible, for example, to modify and/or set the hydrophilicity or hydrophobicity of the pigment surface. For example, via the surface modification, it is possible to modify and/or set the leafing or nonleafing properties of the multilayer pearlescent pigments of the invention. By leafing is meant that, in an application medium, such as a paint or a printing ink, for example, the multi-layer pearlescent pigments of the invention take up a position at or close to the interface or surface of the application medium.

The surface modifiers may also have reactive chemical groups, such as, for example, acrylate, methacrylate, vinyl, isocyanate, cyano, epoxy, hydroxyl or amino groups or mixtures thereof. These chemically reactive groups allow chemical attachment, especially formation of covalent bonds, to the application medium or to components of the application medium, such as binders, for example. By this means it is possible to make improvements in, for example, the chemical and/or physical properties of cured varnishes, paints or printing inks, such as resistance to environmental influences such as humidity, insolation, UV resistance, etc., or with respect to mechanical influences, examples being scratches, etc.

The chemical reaction between the chemically reactive groups and the application medium or components of the application medium may be induced, for example, by irradiation of energy, in the form of UV radiation and/or heat, for example.

For the incorporation of multilayer pearlescent pigments aftercoated with silanes and/or provided with an outer protective layer into cosmetic formulations it is necessary to ensure that the corresponding silane and/or the material of the outer protective layer is allowable in accordance with cosmetics law.

In a further embodiment, the present invention comprises multilayer pearlescent pigments, comprising platelet-shaped transparent substrates provided with an optically active coating, wherein the optically active coating comprises at least (a) a nonabsorbing high-index layer A having a refractive index n≥1.8,
(b) a nonabsorbing low-index layer B having a refractive index n<1.8,
(c) a nonabsorbing high-index layer C having a refractive index n≥1.8
and also
(d) optionally at least one outer protective layer D and the multilayer pearlescent pigments have a cumulative frequency distribution of a volume-averaged size distribution function, with the indices $D_{10}$, $D_{50}$, $D_{90}$ and a span $\Delta D$ in a range from 0.8-1.2, the span $\Delta D$ being calculated in accordance with formula (I)

$$\Delta D = (D_{90} - D_{10})/D_{50} \qquad (I).$$

In a further embodiment, the high-index layers A and C in each case comprise titanium dioxide and the low-index layer B comprises silicon dioxide. In a further embodiment, the high-index layers A and C are in each case composed of titanium dioxide and the low-index layer B is composed of silicon dioxide.

In a further embodiment, the present invention comprises multilayer pearlescent pigments, comprising platelet-shaped transparent substrates provided with an optically active coating, wherein the optically active coating comprises at least
(a) a nonabsorbing high-index layer A having a refractive index n≥1.8,
(b) a nonabsorbing low-index layer B having a refractive index n<1.8,
(c) a nonabsorbing high-index layer C having a refractive index n≥1.8
and also
(d) optionally at least one outer protective layer D and the multilayer pearlescent pigments have a cumulative frequency distribution of a volume-averaged size distribution function, with the indices $D_{10}$, $D_{50}$, $D_{90}$ and a span $\Delta D$ in a range from 0.8-1.2, the span $\Delta D$ being calculated in accordance with formula (I)

$$\Delta D = (D_{90} - D_{10})/D_{50} \qquad (I)$$

and the multilayer pearlescent pigments possessing a chroma $C^*_{15} > 20$.

In a further embodiment, the present invention comprises multilayer pearlescent pigments, comprising platelet-shaped transparent substrates provided with an optically active coating, wherein the optically active coating comprises at least
(a) a nonabsorbing high-index layer A having a refractive index n≥1.8 and an optical layer thickness of 30 nm to 900 nm,
(b) a nonabsorbing low-index layer B having a refractive index n<1.8 and an optical layer thickness of >150 nm,
(c) a nonabsorbing high-index layer C having a refractive index n≥1.8 and an optical layer thickness of 30 nm to 900 nm
and also
(d) optionally at least one outer protective layer D and the multilayer pearlescent pigments have a cumulative frequency distribution of a volume-averaged size distribution function, with the indices $D_{10}$, $D_{50}$, $D_{90}$ and a span $\Delta D$ in a range from 0.8-1.2, the span $\Delta D$ being calculated in accordance with formula $$\Delta D = (D_{90} - D_{10})/D_{50} \qquad (I)$$

In a further embodiment, the present invention comprises multilayer pearlescent pigments, comprising platelet-shaped transparent substrates provided with an optically active coating, wherein the optically active coating comprises at least
(a) a nonabsorbing high-index layer A having a refractive index n≥1.8 and an optical layer thickness of 30 nm to 900 nm,
(b) a nonabsorbing low-index layer B having a refractive index n<1.8 and an optical layer thickness of ≤150 nm,
(c) a nonabsorbing high-index layer C having a refractive index n≥1.8 and an optical layer thickness of 30 nm to 900 nm
and also
(d) optionally at least one outer protective layer D and the multilayer pearlescent pigments have a cumulative frequency distribution of a volume-averaged size distribution function, with the indices $D_{10}$, $D_{50}$, $D_{90}$ and a span $\Delta D$ in a range from 0.8-1.2, the span $\Delta D$ being calculated in accordance with formula $$\Delta D = (D_{90} - D_{10})/D_{50} \qquad (I).$$

A method for producing the multilayer pearlescent pigments comprises the following steps:
(i) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range of 0.7-1.4, the span $\Delta D$ being defined in accordance with the formula $\Delta D = (D_{90} - D_{10})/D_{50}$,
(ii) applying at least the layers A to C to the platelet-shaped transparent substrates, and also, optionally, at least one layer D, or
(iii) applying at least the layers A to C to the platelet-shaped transparent substrates, and also, optionally, at least one layer D,
(iv) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range of 0.7-1.4, the span $\Delta D$ being defined in accordance with the formula $\Delta D = (D_{90} - D_{10})/D_{50}$.

If the initial substrates are too large, it is possible, optionally, for a comminuting step to be carried out prior to the size-classifying.

The size-classifying may take place before or after the coating of the substrates. Advantageously, however, the substrate is first classified and then coated. Size-classifying is carried out, and optionally repeated, until the multilayer pearlescent pigments have the size distribution according to the invention.

A narrow span $\Delta D$ for the substrates may be achieved by suitable comminuting and/or classifying operations on the substrates to be coated. The substrates to be coated may be comminuted, for example, by ball mill, jet or agitator ball mill, edge-runner mill or dissolver. The span $\Delta D$ of the final fraction can be adjusted by appropriate classifying, such as a multiple wet screening, for example. Other classifying methods include centrifugation in cyclones or sedimentation from a dispersion.

The comminuting and classifying operations may take place in succession and optionally may be combined with one another. Hence a comminuting operation may be followed by a classifying operation, which is followed by a further comminuting operation on the fine fraction, and so on.

The metal oxide layers are preferably applied wet-chemically, in which case the wet-chemical coating methods developed for the production of pearlescent pigments may be employed. In the case of wet coating, the substrate particles are suspended in water and are admixed with one or more hydrolyzable metal salts or with a waterglass solution at a pH which is suitable for hydrolysis and which is selected such that the metal oxides and/or metal oxide hydrates are precipitated directly on the substrate to be coated, without any instances of secondary precipitation. The pH is typically held constant by simultaneous metered addition of a base and/or acid. The pigments are subsequently separated off, washed, dried at 50-150° C. for 6-18 hours, and optionally calcined for 0.5-3 hours, it being possible for the calcining temperature to be optimized in terms of the particular coating present. Generally speaking, the calcining temperatures are between 550 and 1000° C., preferably between 600 and 900° C. If desired, the pigments, following application of individual coatings, may be separated off, dried, and optionally calcined, before then being resuspended for the precipitation of the further layers.

The precipitation of the $SiO_2$ layer onto the substrate to be coated may be accomplished by addition of a potassium or sodium waterglass solution at a suitable pH. The $SiO_2$ layer may alternatively be applied via sol-gel methods, starting from alkoxysilanes, such as tetraethoxysilane, for example.

The multilayer pearlescent pigments of the invention can also be used advantageously in blends with transparent and hiding white, chromatic, and black pigments, and also with other effect pigments.

The multilayer pearlescent pigments of the invention can be used for producing pigment preparations and dry products.

Furthermore, the multilayer pearlescent pigments of the invention can be used, for example, in cosmetics formulations, plastics, ceramic materials, glasses, and coating compositions such as paints, printing inks, as for example for offset, screen, gravure, flexographic or security printing or for bronze printing, liquid inks, in toners, coating materials, e.g., auto finishes or powder coating materials, for the laser marking of paper and plastics, for seed coloring, for coloring foods or pharmaceutical products, or for coloring (agricultural) films, tarpaulins or textiles.

In cosmetics formulations, the multilayer pearlescent pigments of the invention with a nonsilver interference color can be combined with raw materials, auxiliaries, and actives that are suitable for the particular application. The concentration of the multilayer pearlescent pigments in the formulation may lie between 0.001% by weight for rinse-off products and 40.0% by weight for leave-on products.

The multilayer pearlescent pigments of the invention are suitable more particularly for use in cosmetics, such as, for example, body powders, face powders, pressed and loose powder, face makeup, powder cream, cream makeup, emulsion makeup, wax makeup, foundation, mousse makeup, rouge, eye makeup such as eyeshadow, mascara, eyeliners, liquid eyeliners, eyebrow pencil, lipcare stick, lipstick, lip gloss, lip liner, hairstyling compositions such as hairspray, hair mousse, hair gel, hair wax, hair mascara, permanent or semipermanent hair colors, temporary hair colors, skincare compositions such as lotions, gels, and emulsions, and also nail varnish compositions.

In order to obtain specific color effects it is possible, in the cosmetics applications, to use not only the multilayer pearlescent pigments of the invention but also further colorants and/or conventional effect pigments or mixtures thereof in variable proportions. Conventional effect pigments used may be, for example, commercial pearlescent pigments based on natural mica coated with high-index metal oxides (such as, for example, the Prestige product group from Eckart), BiOCl platelets, $TiO_2$ platelets, pearlescent pigments based on synthetic mica coated with high-index metal oxides or based on glass platelets coated with high-index metal oxides (such as, for example, the MIRAGE product group from Eckart), $Al_2O_3$, $SiO_2$ or $TiO_2$ platelets. Moreover, it is also possible for metallic effect pigments to be added, such as the Visionaire product group from Eckart, for example. The colorants may be selected from inorganic or organic pigments.

EXAMPLES

The invention is elucidated in more detail below through a number of examples, without being confined to these examples.

I Preparation of the Pigments

A Classification of the Substrates

Inventive Example 1

Classification of Glass Flakes with Narrow Span ΔD=1.0

A suspension of 200 g of glass flakes (GF100M from Glassflake Ltd) in FD water (FD=fully demineralized, approximately 3% by weight content) was classified on a 100 µm sieve, and the sieve undersize was sieved again on a 63 µm sieve. This sieving procedure was repeated twice with sieve residue obtained on the 63 µm sieve. This gave a glass flake fraction having the following particle size distribution (Malvern Mastersizer 2000): $D_{10}$=50 µm, $D_{50}$=82 µm, $D_{90}$=132 µm, span ΔD=1.0.

Comparative Example 1

Classification of Glass Flakes with Broad Span ΔD=2.0

A suspension of 200 g of glass flakes (GF 100M from Glassflake Ltd) in FD water (approximately 3% by weight content) was classified on a 150 µm sieve, and the sieve undersize was sieved again on a 34 µm sieve. This sieving procedure was repeated twice with sieve residue obtained on the 34 µm sieve. This gave a glass flake fraction having the following particle size distribution (Malvern Mastersizer 2000): $D_{10}$=25 µm, $D_{50}$=88 µm, $D_{90}$=200 µm, span ΔD=1.99.

Inventive Example 2

Classification of Synthetic Mica with Narrow Span ΔD=1.2

A suspension of 200 g of artificial mica Sanbao 10-40 (Shantou F.T.Z. Sanbao Pearl Luster Mica Tech Co., Ltd. China) in FD water (about 3% by weight content) was classified on a 34 µm sieve, and the sieve undersize was again sieved on a 20 µm sieve. This sieving procedure was repeated twice with sieve residue obtained on the 20 µm sieve. This gave a mica fraction which had the following particle size distribution (Malvern Mastersizer 2000): $D_{10}$=14 µm, $D_{50}$=26 µm, $D_{90}$=45 µm, span ΔD=1.2.

Comparative Example 2

Classification of Synthetic Mica with Broad Span ΔD=3.7

1000 g of commercial unclassified synthetic/artificial mica Sanbao (from Shantou F.T.Z. Sanbao Pearl Luster Mica Tech Co., Ltd. China) was admixed with 1000 ml of FD water, and subsequently delaminated for approximately 1 h in a laboratory edge-runner mill from American Cyanamid Company.

The cake was subsequently diluted with FD water to a solids content of 25% by weight and treated in a Pendraulik TD 200 laboratory dissolver for 1 h. In the course of this treatment, care is to be taken to ensure that, by cooling, the temperature of the suspension does not exceed 80° C.

The suspension was subsequently brought with FD water to a solids content of 3% by weight and was sieved on a Sweco Separator laboratory sieve to <250 µm.

The resulting mica fraction was then filtered off under suction on a Büchner funnel, and the filtercake obtained was used as starting material for further coatings.

This gave a mica fraction having the following particle size distribution (Malvern Mastersizer 2000): $D_{10}$=17.7 µm, $D_{50}$=74.6 µm, $D_{90}$=292.3 µm, span $\Delta D$=3.7.

Inventive Example 3

Classification of Glass Flakes with Narrow Span $\Delta D$=1.0

A suspension of 200 g of glass flakes (GF 100M from Glassflake Ltd) in FD water (approximately 3% by weight content) was classified on a 63 µm sieve, and the sieve undersize was sieved again on a 34 µm sieve. This sieving procedure was repeated twice with sieve residue obtained on the 34 µm sieve. This gave a glass flake fraction having the following particle size distribution (Malvern Mastersizer 2000): $D_{10}$=32 µm, $D_{50}$=62 µm, $D_{90}$=93 µm, span $\Delta D$=1.0.

B Preparation of Single-Layer Pigments (Starting Material for Multilayer Pearlescent Pigments)

Comparative Example 3

Preparation of the Starting Material for Inventive Example 4

200 g of glass flakes from inventive example 1 were suspended in 2000 ml of FD water and heated to 80° C. with turbulent stirring. The pH of the suspension was adjusted to 1.9 using dilute HCl, and then a first layer of "$SnO_2$" was precipitated onto the glass flakes. This layer was formed by addition of a solution consisting of 3 g of $SnCl_4 \times 5\, H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 75 ml of $TiCl_4$ (200 g $TiO_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color.

Comparative Example 4

Preparation of the Starting Material for Inventive Example 5

200 g of glass flakes from inventive example 3 were suspended in 2000 ml of FD water and heated to 80° C. with turbulent stirring. The pH of the suspension was adjusted to 1.9 using dilute HCl, and then a first layer of "$SnO_2$" was precipitated onto the glass flakes. This layer was formed by addition of a solution consisting of 3 g of $SnCl_4 \times 5\, H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 77 ml of $TiCl_4$ (200 g $TiO_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color.

Comparative Example 5

Synthetic Mica/$TiO_2$ (Rutile)

200 g of synthetic mica from inventive example 2 were suspended in 2000 ml of FD water and heated to 80° C. with turbulent stirring. The pH of the suspension was adjusted to 1.9 using dilute HCl, and then a first layer of "$SnO_2$" was precipitated onto the synthetic mica. This layer was formed by addition of a solution consisting of 5 g of $SnCl_4 \times 5\, H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 900 ml of $TiCl_4$ (200 g $TiO_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 750° C. for 30 min. This gave a lustrous pearlescent pigment with a blue interference color.

Comparative Example 6

Preparation of the Starting Material for Comparative Example 7

200 g of glass flakes from comparative example 1 were suspended in 2000 ml of FD water and heated to 80° C. with turbulent stirring. The pH of the suspension was adjusted to 1.9 using dilute HCl, and then a first layer of "$SnO_2$" was precipitated onto the glass flakes. This layer was formed by addition of a solution consisting of 3 g of $SnCl_4 \times 5\, H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 75 ml of $TiCl_4$ (200 g $TiO_2$/l FD water) was metered into the suspension. During the addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 650° C. for 30 min. This gave a lustrous effect pigment with a silver interference color.

C Preparation of the Multilayer Pearlescent Pigments

Inventive Example 4

Glass Flakes/TiO$_2$ (Rutile)/SiO$_2$/TiO$_2$ (Rutile)

200 g of TiO$_2$-coated glass flakes from comparative example 3 were suspended in 1300 ml of FD water and heated to 80° C. with turbulent stirring. The pH was raised to 7.5 using 5% strength by weight NaOH solution, followed by stirring for 15 min. A waterglass solution (255 g of waterglass solution, 27% by weight SiO$_2$, mixed with 255 g of FD water) was then introduced slowly into the suspension and the pH was kept constant at 7.5. This was followed by stirring for a further 20 min, and the pH was lowered to 1.9. Then a layer of "SnO$_2$" was deposited on the SiO$_2$ surface. This layer was formed by addition of a solution consisting of 3 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 95 ml of TiCl$_4$ (200 g TiO$_2$/l FD water) was metered into the suspension. During the addition, the pH was kept constant at 1.6 by counter-control with 10% strength by weight NaOH solution. This was followed by stirring for a further 15 minutes, by filtration, and by washing of the filtercake with FD water. The filtercake was initially dried at 100° C. and calcined at 650° C. for 30 min. This gave an extremely highly lustrous multilayer pearlescent pigment with a red interference color at a specular angle which, at the flat observation angle tilts to a greenish gold tone.

Comparative Example 7

Glass Flakes/TiO$_2$ (Rutile)/SiO$_2$/TiO$_2$ (Rutile)

200 g of TiO$_2$-coated glass flakes from comparative example 6 were suspended in 1300 ml of FD water and heated to 80° C. with turbulent stirring. The pH was raised to 7.5 using 5% strength by weight NaOH solution, followed by stirring for 15 min. A waterglass solution (255 g of waterglass solution, 27% by weight SiO$_2$, mixed with 255 g of FD water) was then introduced slowly into the suspension and the pH was kept constant at 7.5. This was followed by stirring for a further 20 min, and the pH was lowered to 1.9. Then a layer of "SnO$_2$" was deposited on the SiO$_2$ surface. This layer was formed by addition of a solution consisting of 3 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 95 ml of TiCl$_4$ (200 g TiO$_2$/l FD water) was metered into the suspension. During the addition, the pH was kept constant at 1.6 by counter-control with 10% strength by weight NaOH solution. This was followed by stirring for a further 15 minutes, by filtration, and by washing of the filtercake with FD water. The filtercake was initially dried at 100° C. and calcined at 650° C. for 30 min. This gave a multilayer pearlescent pigment with a reddish-blue interference color.

Comparative Example 8

Synthetic Mica/TiO$_2$ (Rutile)/SiO$_2$/TiO$_2$ (Rutile)

200 g of synthetic mica from comparative example 2 with a span of 3.7 were suspended in 2000 ml of FD water and heated to 80° C. with turbulent stirring. The pH of the suspension was adjusted to 1.9 using dilute HCl, and then a first layer of "SnO$_2$" was precipitated onto the synthetic mica. This layer was formed by addition of a solution consisting of 6 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 320 ml of TiCl$_4$ (200 g TiO$_2$/l FD water) was metered into the suspension. During the addition, the pH was kept constant at 1.6 by counter-control with 10% strength by weight NaOH solution. Thereafter the pH was raised to 7.5 using 5% strength by weight NaOH solution, and stirring was carried out for 15 min. A waterglass solution (200 g of waterglass solution, 24% by weight SiO$_2$, mixed with 207 g of FD water) was then introduced slowly into the suspension and the pH was kept constant at 7.5. This was followed by further stirring for 20 min, and the pH was lowered to 1.9 again. Then a second layer of "SnO$_2$" was deposited on the SiO$_2$ surface. This layer was formed by addition of a solution consisting of 6 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 300 ml of TiCl$_4$ (200 g TiO$_2$/l FD water) was metered into the suspension. During this addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 750° C. for 30 min. This gave a weakly lustrous multilayer pearlescent pigment with a blue interference color and a span of 3.7.

Inventive Example 5

Glass Flakes/TiO$_2$ (Rutile)/SiO$_2$/TiO$_2$ (Rutile)

200 g of TiO$_2$-coated glass flakes from comparative example 4 were suspended in 1300 ml of FD water and heated to 80° C. with turbulent stirring. The pH was raised to 7.5 using 5% strength by weight NaOH solution, followed by stirring for 15 min. A waterglass solution (40 g of waterglass solution, 27% by weight SiO$_2$, mixed with 40 g of FD water) was then introduced slowly into the suspension and the pH was kept constant at 7.5. This was followed by stirring for a further 20 min and the pH was lowered to 1.9. Then a layer of "SnO$_2$" was deposited on the SiO$_2$ surface. This layer was formed by addition of a solution consisting of 3 g of SnCl$_4$×5 H$_2$O (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 200 ml of TiCl$_4$ (200 g TiO$_2$/l FD water) was metered into the suspension. During the addition, the pH was kept constant at 1.6 by counter-control with 10% strength by weight NaOH solution. This was followed by stirring for a further 15 minutes, by filtration, and by washing of the filtercake with FD water. The filtercake was initially dried at 100° C. and calcined at 650° C.

for 30 min. This gave an extremely highly lustrous multilayer pearlescent pigment with a golden interference color.

Inventive Example 6

Synthetic Mica/$TiO_2$ (Rutile)/$SiO_2$/$TiO_2$ (Rutile)

200 g of synthetic mica from inventive example 2 with a span of 1.2 were suspended in 2000 ml of FD water and heated to 80° C. with turbulent stirring. The pH of the suspension was adjusted to 1.9 using dilute HCl, and then a first layer of "$SnO_2$" was precipitated onto the synthetic mica. This layer was formed by addition of a solution consisting of 6 g of $SnCl_4 \times 5\ H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 100 ml of $TiCl_4$ (200 g $TiO_2$/l FD water) was metered into the suspension. During the addition, the pH was kept constant at 1.6 by counter-control with 10% strength by weight NaOH solution. Thereafter the pH was raised to 7.5 using 5% strength by weight NaOH solution, and stirring was carried out for 15 min. A waterglass solution (200 g of waterglass solution, 24% by weight $SiO_2$, mixed with 207 g of FD water) was then introduced slowly into the suspension and the pH was kept constant at 7.5. This was followed by further stirring for 20 min, and the pH was lowered to 1.9 again. Then a second layer of "$SnO_2$" was deposited on the $SiO_2$ surface. This layer was formed by addition of a solution consisting of 6 g of $SnCl_4 \times 5\ H_2O$ (in 10 ml of conc. HCl+50 ml of FD water), with simultaneous metered addition of a 10% strength by weight NaOH solution in order to keep the pH constant, over a period of 1 h. In order to complete the precipitation, the suspension was stirred for a further 15 min. Thereafter the pH was lowered to 1.6 using dilute HCl, and then a solution of 100 ml of $TiCl_4$ (200 g $TiO_2$/l FD water) was metered into the suspension. During this addition, the pH was kept constant at 1.6 by counter-control with 10% strength by weight NaOH solution. This was followed by stirring for 15 min more, by filtration, and by washing of the filtercake with FD water. The filtercake was dried initially at 100° C. and calcined at 750° C. for 30 min. This gave a very brilliant multilayer pearlescent pigment with an extremely blue interference color.

II PHYSICAL CHARACTERIZATION

IIa Angle-Dependent Color Measurements

For the measurement of the chroma values, the multilayer pearlescent pigments were incorporated by stirring, with a level of pigmentation of 6% by weight (based on the total weight of the wet varnish), into a conventional nitrocellulose varnish (Dr. Renger Erco Bronzemischlack 2615e; from Morton). The multilayer pearlescent pigments were introduced first and then dispersed into the varnish using a brush.

The completed varnish was applied on a drawdown apparatus (RK Print Coat Instr. Ltd. Citenco K 101), with a wet film thickness, depending on $D_{50}$ value of the multilayer pearlescent pigment, in accordance with table 1, onto Byk-Gardner black/white drawdown charts (Byko-Chart 2853), and subsequently dried at room temperature.

Using a multi-angle colorimeter, Byk Mac (from Byk Gardener), with a constant incident angle of 45° (in accordance with manufacturer specifications), the L* and C* values were determined at different angles of observation relative to the specular angle. Particularly relevant were the observation angles relatively close to the specular angle, at 15° and −15°. The relevant chroma value of the multilayer pearlescent pigments of the invention was taken to be the $C^*_{15}$ value, which was measured at an angle removed by 15° from the specular.

Strongly reflecting samples (ideal mirror case) reflected virtually the entire incident light at the so-called specular angle. Here, the color of the interference color appeared most strongly. The further from the specular angle in the course of measurement, the less light and hence interference effect it was possible to measure.

IIb Gloss Measurements

The gloss is a measure of the directed reflection and can be characterized using a Micro-Tri-Gloss instrument. More strongly scattering samples therefore exhibit a low gloss.

The nitro varnish applications from IIa were subjected to measurement using a Micro-Tri-Gloss gloss meter from Byk Gardner at a measurement angle of 20° for high-gloss samples and at 60° for medium-gloss samples, on a black background. Where the gloss values at 60° were above 70 gloss units, the samples are measured at 20° (Byk-Gardner catalogue 2007/2008, p. 14).

IIc Particle Size Determination:

The size distribution curve was determined using an instrument from Malvern (instrument: Malvern Mastersizer 2000) in accordance with manufacturer indications. For this purpose, about 0.1 g of the pigment in question was placed in the form of an aqueous suspension, without addition of dispersing assistants, and with continual stirring with a Pasteur pipette, into the sample preparation cell of the measuring instrument, and subjected to repeated measurement. From the individual measurement results, the resultant averages were formed. The scattered light signals in this case were evaluated in accordance with the theory of Mie, which also includes refraction and absorption behavior of the particles (FIG. 2).

The average size $D_{50}$ refers in the context of this invention to the $D_{50}$ value of the cumulative undersize curve of the volume-averaged size distribution function, as obtained by laser diffraction methods. The $D_{50}$ value indicates that 50% of the pigments have a diameter which is the same as or smaller than the stated value, for example 20 μm.

Accordingly, the $D_{90}$ value indicates that 90% of the pigments have a diameter which is the same as or smaller than the value in question.

Additionally, the $D_{10}$ value indicates that 10% of the pigments have a diameter which is the same as or smaller than the value in question.

The span $\Delta D$, defined as $\Delta D = (D_{90} - D_{10})/D_{50}$, gives the breadth of the distribution.

III Results

TABLE 3

Characterization of the effect pigments

| Effect pigment | Construction | Gloss, 20° | $C^*_{15}$ | Span |
|---|---|---|---|---|
| Comparative example 3 | Glass flake/$TiO_2$ | 78.0 | 6.0 | 1.1 |
| Comparative example 4 | Glass flake/$TiO_2$ | 44.0 | 5.7 | 1.1 |
| Comparative example 6 | Glass flake/$TiO_2$ | 67.8 | 6.4 | 2.0 |
| Inventive example 4 | Glass flake/$TiO_2$/ $SiO_2$/$TiO_2$ | 95.4 | 24.4 | 1.1 |

TABLE 3-continued

Characterization of the effect pigments

| Effect pigment | Construction | Gloss, 20° | $C^*_{15}$ | Span |
|---|---|---|---|---|
| Comparative example 7 | Glass flake/TiO$_2$/SiO$_2$/TiO$_2$ | 70.5 | 14.6 | 2.0 |
| Example 5 | Glass flake/TiO$_2$/SiO$_2$/TiO$_2$ | 53.7 | 21.3 | 1.1 |

From the data in table 3 it can clearly be seen that the inventive example 4, with the layer construction glass flake/TiO$_2$/SiO$_2$/TiO$_2$ and a low span, exhibited a strong gloss gain of 17.4 units in comparison with the starting material. For the comparative example 7 with a broad span, a gloss value was found which was only increased by 2.7 units. The chroma of the inventive example 4 is also, with 24.4 units, significantly increased in comparison with the comparative example 7 with 14.6 units.

For the inventive example 5, a gloss value is found which is increased by 9.7 units in comparison with the starting material, comparative example 4.

TABLE 4

Characterization of the effect pigments

| Effect pigment | Construction | Gloss, 60° | $C^*_{15}$ | Span |
|---|---|---|---|---|
| Inventive example 6 | synth. mica/TiO$_2$/SiO$_2$/TiO$_2$ | 67.9 | 29.1 | 1.2 |
| Comparative example 5 | synth. mica/TiO$_2$ | 29.5 | 25.6 | 1.2 |
| Comparative example 8 | synth. mica/TiO$_2$/SiO$_2$/TiO$_2$ | 19.1 | 16.5 | 3.7 |

According to table 4, an extreme luster boost effect is observed for inventive example 6 in comparison to comparative examples 5 and 8. The combination of narrow span with the multilayer technology has significant advantages in relation to the individual technologies.

In FIG. 3 it can be seen, significantly, that a narrow span implies not only a significant boost to luster but also a distinct increase in the chroma values of multilayer pearlescent effect pigments. In FIG. 3, the color profile with increasing thickness of titanium dioxide layer on a substrate, with a construction of synthetic mica/TiO$_2$ (approximately 50 nm)/SiO$_2$ (approximately 40 nm), with a span of 1.2, is observed in comparison to the color profile with a substrate of the same construction but with a span of 3.7.

IV. Performance Examples

In the cosmetic application examples below, the inventive multilayer pearlescent pigments produced by one of the above examples were used.

Example 7

Transparent Lipstick

| INCI name | Product name | % by weight | Supplier |
|---|---|---|---|
| Phase A | | 100.00 | |
| Ethylenediamine/hydrogenated dimer dilinoleate copolymer bis-di-C14-18 alkyl amide | Sylvaclear A2614V | 28.00 | www.arizonachemical.com |
| Bis-stearyl ethylenediamine/neopentyl glycol/hydrogenated dimer dilinoleate | Sylvaclear C75V | 28.00 | www.arizonachemical.com |
| Paraffinum liquidum | Paraffinum liquidum | 13.80 | www.heess.de |
| *Macadamia integrifolia* seed oil | Floramac Hawaiian macadamia oil refined | 10.00 | www.floratech.com |
| Isopropyl myristate | isopropyl myristate | 6.00 | www.vwr.com |
| C12-15 alkyl benzoate | Sympatens-LBZ | 6.00 | www.kolb.ch |
| Caprylic/capric triglyceride | Miglyol 812 | 7.00 | www.sasolwax.com |
| Propylparaben | Propyl-4-hydroxy-benzoate | 0.20 | www.sigmaaldrich.com |
| Phase B | | | |
| Multilayer pearlescent pigment | Multilayer pearlescent pigment | 1.00 | |

The multilayer pearlescent pigment can be used in a range of 0.01%-5.0% by weight. The balance can be made up with Paraffinum Liquidum.

Phase A was heated to 85° C., and then phase B was added to phase A and the phases were mixed. The mixture was then introduced, with a temperature of 75° C., into a lipstick mold.

Example 8

Body Lotion Water-in-Silicone

| INCI name | Product name | wt % | Supplier |
|---|---|---|---|
| Phase A | | 100.00 | |
| Cyclopentasiloxane (and) dimethiconol | Dow Corning 1501 | 11.20 | www.dowcorning.com |
| Cyclopentasiloxane | Dow Corning 245 | 5.75 | www.dowcorning.com |
| Cyclopentasiloxane (and) PEG/PPG/-18/18 Dimethicone | Dow Corning 5225 C | 13.80 | www.dowcorning.com |

-continued

| INCI name | Product name | wt % | Supplier |
|---|---|---|---|
| C30-45 Alkyl Methicone | Dow Corning Cosmetic Wax AMS-C30 | 3.45 | www.dowcorning.com |
| Multilayer pearlescent pigment | Multilayer pearlescent pigment | 1.50 | |
| Phase B | | | |
| Polysorbate 20 | Tween 20 | 0.60 | www.uniqema.com |
| Phenoxyethanol (and) methylparaben (and) ethylparaben (and) butylparaben | Uniphen P-23 | 0.35 | www.induchem.com |
| Sodium chloride | Sodium chloride | 0.75 | www.vwr.com |
| Aqua | Water | 63.10 | |

The multilayer pearlescent pigment can be used in a range from 0.5%-2.5% by weight. The balance can be made up with water.

Phase A was mixed and heated to 75° C., phase B was heated to 70° C. after mixing, and then phase B was added slowly, with homogenization, to phase A. With stirring, the emulsion was cooled and dispensed into an appropriate container.

Example 9

Shower Gel

| INCI name | Product name | % by weight | Supplier |
|---|---|---|---|
| Phase A | | 100.00 | |
| Multilayer pearlescent pigment | Multilayer pearlescent pigment | 0.01 | |
| Aqua | Water | 68.21 | |
| Blue 1 (0.5% by weight aqueous solution) | Blue 1 | 0.10 | www.sunchemicals.com |
| Acrylates/C10-30 alkyl acrylate crosspolymer | Carbopol ETD 2020 | 1.00 | www.noveon.com |
| Propylene glycol | 1,2-propanediol | 1.00 | www.vwr.com |
| Phase B | | | |
| TEA-lauryl sulfate | Texapon T 42 | 22.00 | www.cognis.com |
| Cocamide DEA | Rewomid DC 212 S | 3.00 | www.degussa.com |
| Cocamidopropyl betaine | Tego Betain F 50 | 4.00 | www.cognis.com |
| Disodium EDTA | Edeta BD | 0.05 | www.basf.com |
| Phase C | | | |
| Triethanolamine | Triethanolamine | 0.30 | www.vwr.com |
| Phenoxyethanol, ethylhexylglycerin | Euxyl PE 9010 | 0.60 | www.schuelke.com |

The multilayer pearlescent pigment may be used in a range of 0.01%-1.0% by weight. The balance can be made up with water.

Carbopol was dispersed in phase A and stirred for 15 minutes, followed by heating to 65° C. Thereafter, the raw materials of phase B were added individually to phase A with slow stirring. The mixture was then cooled to 40° C. and phase C was added.

Example 10

Hair Gel

| INCI name | Product name | wt % | Supplier |
|---|---|---|---|
| Phase A | | 100.00 | |
| Multilayer pearlescent pigment | Multilayer pearlescent pigment | 0.10 | |
| Ammonium acryloyldimethyl-taurate/VP copolymer | Aristoflex AVC | 1.40 | www.clariant.com |
| Citric acid | Citric acid | 0.10 | www.vwr.com |
| Aqua | Water | 55.10 | |
| Phase B | | | |
| PVP | Luviskol K30 powder | 1.50 | www.basf.com |
| Propylene glycol, diazolidinyl, urea, methylparaben, propylparaben | Germaben II | 0.20 | www.ispcorp.com |
| Triethanolamine | Triethanolamine | 1.20 | www.vwr.com |
| Water | Aqua | 40.40 | |

The multilayer pearlescent pigment can be used in a range from 0.01%-0.5% by weight. The balance can be made up with water.

The pigment was stirred together with the water of phase A, Aristoflex AVP and citric acid were added with stirring, and the composition was mixed for 15 minutes at a speed of 800 rpm. The ingredients of phase B were dissolved until a homogeneous solution was produced, and then phase B was added to phase A, and the composition was mixed.

Example 11

Body Powder

| INCI name | Product name | wt % | Supplier |
|---|---|---|---|
| Phase A | | 100.00 | |
| Mica | Silk Mica | 42.20 | www.vwr.com |
| Talc | Talc Powder | 18.00 | www.riedeldehaen.com |
| Boron nitride | Softouch CCS 102 | 5.00 | www.advceramics.com |
| Nylon-12 | Orgasol 2002 D/Nat | 8.00 | www.atofinachemicals.com |
| Magnesium stearate | Magnesium stearate | 6.00 | www.sigmaaldrich.com |
| Methylparaben, propylparaben | Rokonsal SSH-1 | 0.30 | www.biochema.com |
| Mica (and) iron oxides | Prestige Soft Bronze | 9.00 | www.eckart.net |
| Multilayer pearlescent pigment | Multilayer pearlescent pigment | 0.50 | |
| Mica (and) titanium dioxide | Prestige Magic Orange | 9.00 | www.eckart.net |

-continued

| INCI name | Product name | wt % | Supplier |
|---|---|---|---|
| Phase B | | | |
| Tridecyl stearate (and) tridecyl trimellitate (and) dipentaerythrityl hexacaprylate/ hexacaprate | Lipovol MOS-130 | 2.00 | www.lipochemicals.com |

The multilayer pearlescent pigment can be used in a range from 0.2%-5.0% by weight. The balance can be made up with mica.

The ingredients of phase A were mixed together, and then phase B was added to phase A. After mixing, dispense into a vessel.

Example 12

Lip Gloss

| INCI name | Product name | wt % | Supplier |
|---|---|---|---|
| Phase A | | 100.00 | |
| Hydrogenated polyisobutene (and) ethylene/propylene/-styrene copolymer (and) butylene/-ethylene/styrene copolymer | Versagel ME 750 | 78.90 | www.penreco.com |
| Simmondsia Chinensis (jojoba) seed oil | Jojoba oil - natural/golden | 2.00 | www.biochemica.com |
| Caprylyl trimethicone | Silcare Silicone 31M50 | 7.00 | www.clariant.com |
| Stearyl dimethicone | Silcare Silicone 41M65 | 3.20 | www.clariant.com |
| Hydrogenated polydecene | Nexbase 2002 | 4.00 | www.jandekker.com |
| Isopropyl myristate | Isopropyl myristate | 4.50 | www.vwr.com |
| Phase B | | | |
| Multilayer pearlescent pigment | Multilayer pearlescent pigment | 0.20 | |
| Propylparaben | Propyl-4-hydroxy-benzoate | 0.20 | www.sigmaaldrich.com |

The multilayer pearlescent pigment can be used in a range from 0.01%-0.50% by weight. The balance can be made up with Versagel ME 750.

Phase A was heated to 85° C., and then the ingredients of phase B were added individually to phase A and the mixture was stirred until its consistency was uniform, at which point it was dispensed into a lip gloss vessel.

What is claimed is:

1. Multilayer pearlescent pigments, comprising platelet-shaped transparent substrates provided with an optically active coating, wherein the optically active coating comprises at least
    (a) a nonabsorbing high-index layer A having a refractive index n≥1.8,
    (b) a low-index layer B having a refractive index n<1.8,
    (c) a nonabsorbing high-index layer C having a refractive index n≥1.8 and also
    (d) optionally at least one outer protective layer D
and in that the multilayer pearlescent pigments have a cumulative frequency distribution of a volume-averaged size distribution function, with the indices $D_{10}$, $D_{50}$, $D_{90}$ and a span $\Delta D$ in a range from 0.7-1.4, the span $\Delta D$ being calculated in accordance with formula (I)

$$\Delta D = (D_{90} - D_{10})/D_{50} \quad (I),$$

wherein said multilayer pearlescent pigments have chroma values $C^*_{15} > 20$.

2. The multilayer pearlescent pigments of claim 1, wherein the multilayer pearlescent pigments do not have a silver interference color.

3. The multilayer pearlescent pigments of claim 1, wherein layer B is nonabsorbing.

4. The multilayer pearlescent pigments of claim 1, wherein the multilayer pearlescent pigments have a span $\Delta D$ in a range from 0.7-1.3.

5. The multilayer pearlescent pigments of claim 1, wherein the optical layer thickness of layer A is in a range from 30 nm to 900 nm.

6. The multilayer pearlescent pigments of claim 1, wherein the optical layer thickness of layer B is in a range from 30 nm to 500 nm.

7. The multilayer pearlescent pigments of claim 1, wherein the optical layer thickness of layer B is in a range from 30 nm to <150 nm.

8. The multilayer pearlescent pigments of claim 1, wherein the optical layer thickness of layer C is in a range from 30 nm to 900 nm.

9. The multilayer pearlescent pigments of claim 1, wherein layers A and C in each case comprise titanium oxide.

10. The multilayer pearlescent pigments of claim 1, wherein layer B comprises silicon oxide.

11. The multilayer pearlescent pigments of claim 1, wherein the platelet-shaped substrates are selected from the group consisting of natural mica, synthetic mica, glass flakes, $SiO_2$ platelets, $Al_2O_3$ platelets, and mixtures thereof.

12. A method for producing the multilayer pearlescent pigments of claim 1, wherein the method comprises the following steps:
    (i) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range of 0.7-1.4, the span $\Delta D$ being defined in accordance with the formula $\Delta D = (D_{90} - D_{10})/D_{50}$,
    (ii) applying at least the layers A to C to the platelet-shaped transparent substrates, and also, optionally, at least one layer D, or
    (iii) applying at least the layers A to C to the platelet-shaped transparent substrates, and also, optionally, at least one layer D,
    (iv) size-classifying the platelet-shaped transparent substrates to be coated, so that the platelet-shaped transparent substrates to be coated have a volume-averaged size distribution function with the characteristics $D_{10}$, $D_{50}$, $D_{90}$, and a span $\Delta D$ in a range of 0.7-1.4, the span $\Delta D$ being defined in accordance with the formula $\Delta D = (D_{90} - D_{10})/D_{50}$.

13. An article, wherein the article comprises the multilayer pearlescent pigments of claim 1.

14. A preparation, wherein the preparation comprises the multilayer pearlescent pigments of claim 1.

15. The multilayer pearlescent pigments of claim 9, wherein layers A and C in each case comprise titanium dioxide.

16. The multilayer pearlescent pigments of claim 10, wherein layer B comprises silicon dioxide.

* * * * *